J. J. GEST.

Car Spring.

No. 3161 Reissued Oct. 20, 1868

Witnesses

J. D. Patten

H. W. Heilman

Inventor

Joseph J. Gest

By Atty A. Blanchton

N. PETERS, PHOTO-LITHOGRAPHER, WASHINGTON, D. C.

United States Patent Office.

JOSEPH J. GEST, OF CINCINNATI, OHIO.

*Letters Patent No.* 53,291, *dated March* 20, 1866; *reissue No.* 3,161, *dated October* 20, 1868.

IMPROVED CAR-SPRING.

The Schedule referred to in these Letters Patent and making part of the same.

*To whom it may concern:*

Be it known that I, JOSEPH J. GEST, of Cincinnati, in the county of Hamilton, and State of Ohio, have invented a certain new and useful Improvement in Car and Carriage-Springs, of which the following is a full, clear, and exact description, reference being had to the accompanying drawings, making part of this specification.

My invention consists in constructing arched or elliptic springs, with reflexed or reversely-curved ends, and so forming or shaping the blocks or abutments, on and against which the ends of the springs are supported and rest, as that the springs shall practically become shorter without losing their elasticity, and consequently stronger as the load upon them becomes greater.

Figure 1:
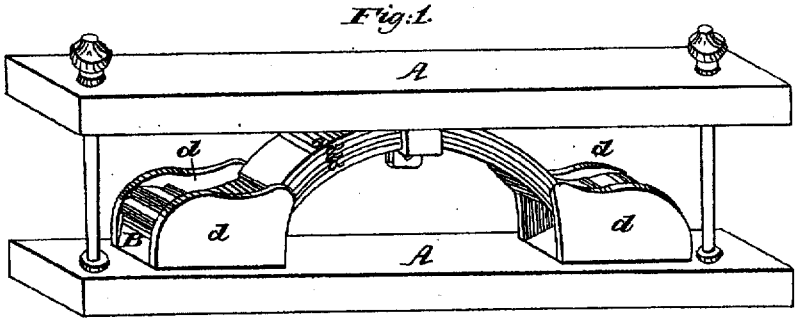
Figure 2:
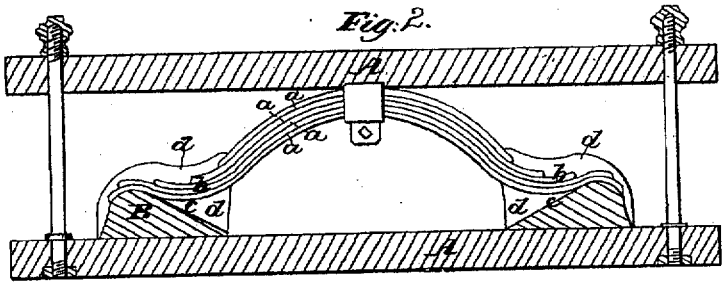
Figure 3:
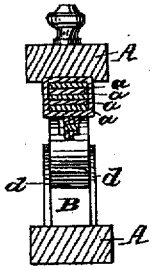
Figure 4:
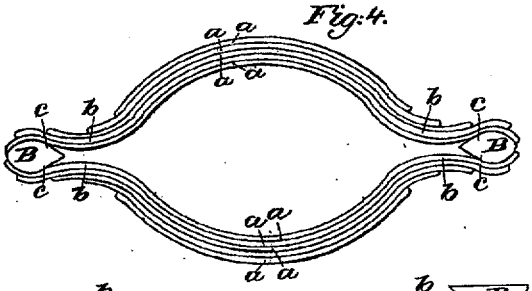
Figure 5:
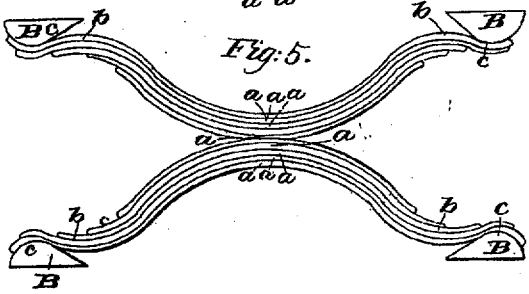

Figures 1, 2, and 3 are side elevations of different forms of spring, embodying my invention.

A represents a portion of the frame for supporting the spring, which frame may be of any of the well-known forms, or the spring may be otherwise applied to cars or carriages, as other springs are generally applied.

B represents the principal or bearing-leaves or plates of my spring, and differ from the customary so-called "elliptical" form in that, at a short distance from their ends, the arched form is reversed, as at *b*, so as to make their convexity inward instead of outward. Any desired number of additional plates, B′, of graduated lengths, may be applied, according to load required to be sustained; the bundle of plates being united by a strap or band, E, or other suitable device.

C are the blocks or abutments, on and against which the ends of the springs rest and are supported. These blocks or abutments may be secured to the frame A, or to the car or carriage, in any of the usual well-known ways, or they may be clasped or held by the leaves of the spring itself.

The blocks or abutments are made convex on that part of them which supports the concave extremities of the springs, and with inclined surfaces *c*, for the support of a greater or less portion of the bearing-leaves, corresponding to the degree of deflection of the spring. These inclined surfaces are straight, as in fig. 1, or of any convex or concave form, as in figs. 2 and 3, the contour of said surfaces being governed wholly by that of those portions of the springs with which they impinge. Thus, a moderate convexity of said impinging portion, as in fig. 1, requires a straight or nearly straight inclined surface in the block; a nearly straight impinging-surface, as in fig. 2, requires a convex inclined surface in the block, and a very convex impinging-surface, as in fig. 3, requires a concave inclined surface in the corresponding portion of the block. These inclined surfaces of the blocks operate to support more or less of the said impinging portions of the bearing-leaves, in proportion to the degree of deflection of the spring under its load, so that as the load is increased upon the spring, and it yields or sinks under it, an increasing portion of the bearing-leaf will impinge upon the block so as to practically shorten the spring, without destroying its motion, and, at the same time, render it stronger by bringing its stronger portions on the blocks.

The blocks may have wings or side-pieces D on or near them, to keep the leaves in proper position thereon. These I prefer to the usual slots and projections, as less weakening to the spring.

Fig. 1 represents a spring composed of one set of leaves, and figs. 2 and 3 of two sets, the crowns of the springs in fig. 2 being opposite, and in fig. 3 in contact. Of course any of the usual forms of springs may be used, it being only necessary to reverse the curved forms of the springs at or near their ends.

I claim, in combination with arched or elliptic springs, having reversed curves at or near their ends, a correspondingly curved or inclined block-abutment or bearing, so that as the spring settles or yields under its load, it will practically become shorter and stronger, but still retain its elastic quality, and be firmly held in place and to the block or bearing, substantially as herein described and represented.

In testimony of which invention, I hereunto set my hand.

JOSEPH J. GEST.

Witnesses:

GEO. H. KNIGHT,

JAMES H. LAYMAN.